US012756732B2

(12) United States Patent
Li et al.

(10) Patent No.: US 12,756,732 B2
(45) Date of Patent: Oct. 6, 2026

(54) MULTIVARIATE TIME SERIES ANOMALY DETECTION

(71) Applicant: Google LLC, Mountain View, CA (US)

(72) Inventors: Yuxiang Li, Mountain View, CA (US); Haoming Chen, Kirkland, WA (US); Jiashang Liu, Kirkland, WA (US); Xi Cheng, Kirkland, WA (US)

(73) Assignee: Google LLC, Mountain View, CA (US)

( * ) Notice: Subject to any disclaimer, the term of this patent is extended or adjusted under 35 U.S.C. 154(b) by 108 days.

(21) Appl. No.: 18/973,018

(22) Filed: Dec. 8, 2024

(65) Prior Publication Data

US 2025/0190292 A1 Jun. 12, 2025

Related U.S. Application Data

(60) Provisional application No. 63/607,784, filed on Dec. 8, 2023.

(51) Int. Cl.
*H04L 9/40* (2022.01)
*G06F 11/07* (2006.01)
(Continued)

(52) U.S. Cl.
CPC ...... *H04L 63/1425* (2013.01); *G06F 11/0751* (2013.01); *G06F 11/0766* (2013.01); *G06F 16/2477* (2019.01); *G06F 21/552* (2013.01)

(58) Field of Classification Search
CPC ............. H04L 63/1425; G06F 11/0751; G06F 11/0766; G06F 16/2477; G06F 21/552
(Continued)

(56) References Cited

U.S. PATENT DOCUMENTS 7,310,590 B1 * 12/2007 Bansal ................ G06F 11/0751 703/22
7,673,191 B2 * 3/2010 Addleman .......... G06F 11/3419 714/57
(Continued)

FOREIGN PATENT DOCUMENTS

EP 3139313 A2 * 3/2017 ............. G06F 17/18

OTHER PUBLICATIONS

Li et al. Multivariate time series anomaly detection: A framework of Hidden Markov Models, Jun. 20, 2017, Elsevier, pp. 229-240. (Year: 2017).*
(Continued)

*Primary Examiner* — John J Tabone, Jr.
(74) *Attorney, Agent, or Firm* — Honigman LLP; Brett A. Krueger

(57) ABSTRACT

A method includes receiving a query to determine anomalies in a set of multivariate time series data values including an endogenous variable and an exogenous variable. The method includes determining an impact of the exogenous variable on the endogenous variable. The method includes determining a set of univariate time series data values and training one or more models using the univariate time series data values. The method includes determining an expected data value for a respective time series data value and determining a difference between the expected data value and the respective time series data value. The method includes determining that the difference between the expected data value for a particular time series data value and the particular time series data value satisfies a threshold. In response, the method includes determining that the particular time series data value is anomalous and reporting the anomalous value to a user.

20 Claims, 8 Drawing Sheets

(51) Int. Cl.
*G06F 16/2458* (2019.01)
*G06F 21/55* (2013.01)

(58) Field of Classification Search
USPC ....... 714/799, 47.1, 47.2, 48, 100, 38.1, 736
See application file for complete search history.

(56) References Cited

U.S. PATENT DOCUMENTS

| | | | | |
|---|---|---|---|---|
| 11,675,646 | B2 * | 6/2023 | Gasthaus .............. | G06F 11/079<br>714/48 |
| 11,860,971 | B2 * | 1/2024 | Buda ........................ | G06F 17/18 |
| 12,267,349 | B1 * | 4/2025 | Black .................. | H04L 63/1425 |
| 2017/0329835 | A1 | 11/2017 | Lee et al. | |
| 2020/0134521 | A1 | 4/2020 | Dumoulin et al. | |
| 2021/0141900 | A1 | 5/2021 | Brown et al. | |
| 2022/0012240 | A1 | 1/2022 | Zait et al. | |
| 2022/0382857 | A1 * | 12/2022 | Liu ........................ | G06F 21/552 |
| 2023/0110056 | A1 | 4/2023 | Gullikson et al. | |
| 2024/0403285 | A1 * | 12/2024 | Huang ................... | G06N 3/045 |
| 2025/0126143 | A1 * | 4/2025 | Sethi ........................ | H04L 41/16 |
| 2025/0190292 | A1 * | 6/2025 | Li ........................ | H04L 63/1425 |

OTHER PUBLICATIONS

Tangjuang Paweena et al: "Outlier Detection for Multivariate Multiple Regression in Y-direction", (Jun. 28, 2014).

International Search Report and Written Opinion issued in related PCT Application No. PCT/US2024/056385, dated Feb. 28, 2025.

* cited by examiner

400A

```
+-Root
  | $1 as ts_timestamp,
  | $10 as ts_data,
  | $20 as is_anomaly,
  | $31 as lower_bound,
  | $30 as upper_bound,
  | $21 as anomaly_probability
  +-Sort($1)
    +-Compute // 2nd compute
      | $20[BOOL]:= $10 > $30 OR $10 < $31, // compare with upper/lower bound

      | $21[DOUBLE]:=
      |   if($4 = 0, if($31 = $10, 0, 1), abs(2 * $stats.normal_cdf($10, $3 + ifnull($5, 0) + $6 + $7
+ $8 + $9, $4) - 1)) // calculate anomaly probability
      +-Compute // 1st compute: compute the upper/lower bound

        | $30[DOUBLE]:= // upper bound = adjusted_data + step_chanege + sum(feature attributions) +
interval
        |   $3 + ifnull($5, 0) + $6 + $7 + $8 + $9 + 1.9564580917358398 * $4,
        | $31[DOUBLE]:= // lower bound = adjusted_data + step_chanege + sum(feature attributions) -
interval
        |   $3 + ifnull($5, 0) + $6 + $7 + $8 + $9 - 1.9564580917358398 * $4
        +-Filter $2 = 1
          +-Scan(model_arimax_with_holiday_effect_breakdown_and_feature_contribution)
              $1:time_series_timestamp[TIMESTAMP],
              $2:time_series_type[INT64],
              $3:time_series_adjusted_data[DOUBLE],
              $4:standard_error[DOUBLE],
              $5:step_changes[DOUBLE],
              $6:attribution_f_n1[DOUBLE],
              $7:attribution_f_n2[DOUBLE],
              $8:attribution_f_c1[DOUBLE],
              $9:attribution___INTERCEPT__[DOUBLE],
              $10:original time series data[DOUBLE]
```

FIG. 4A

400B

```
+-Root
  | $10 as ts_timestamp,
  | $20 as ts_data,
  | $21 as is_anomaly,
  | $31 as lower_bound,
  | $32 as upper_bound,
  | $22 as anomaly_probability,
  | $52 as f_n1,
  | $53 as f_n2,
  | $54 as f_c1
  +-Compute
    | $20[DOUBLE]:= $cast_to_DOUBLE($51),
    | $21[BOOL]:=
    |   if($is_null($30), NULL, $cast_to_DOUBLE($51) > $32 OR $cast_to_DOUBLE($51) < $31),
    | $22[DOUBLE]:=
    |   if($is_null($30), NULL, if($13 = 0, if($31 = $cast_to_DOUBLE($51), 0, 1), abs(2 *
$stats.normal_cdf($cast_to_DOUBLE($51), $30, $13) - 1)))
    +-Compute
      | $30[DOUBLE]:= $12 + $40.#0,
      | $31[DOUBLE]:= $12 + $40.#0 - 1.643071174621582 * $13,
      | $32[DOUBLE]:= $12 + $40.#0 + 1.643071174621582 * $13
      +-Compute
        | $40[STRUCT<prediction DOUBLE, feature_attributions ARRAY<STRUCT<feature STRING, attribution
DOUBLE>>, baseline_prediction_value DOUBLE, prediction_value DOUBLE, approximation_error DOUBLE>]:=
        |   $ml_linear_explain2_unsorted($3, $4, $5, $6, ifnull($cast_to_DOUBLE($52), 1),
ifnull($cast_to_DOUBLE($53), 1), ifnull($54, "_null_filler"), 1, "f_n1", "f_n2", "f_c1",
"__INTERCEPT__", 4)
        +-Join {strategy = "right_broadcast"}
          +-Join(LEFT OUTER) $10 = $cast_to_TIMESTAMP($50)
          | +-Limit(limit:0)
          | | +-Sort($10)
          | |   +-Filter $11 = 2
          | |     +-Scan(arimax_model)
          | |         $10:time_series_timestamp[TIMESTAMP],
          | |         $11:time_series_type[INT64],
          | |         $12:time_series_data[DOUBLE],
          | |         $13:standard_error[DOUBLE]
          | +-Compute
          |   | $50[DATE]:= date(2022-01-01 00:00:00+00),
          |   | $51[INT64]:= 1,
          |   | $52[INT64]:= 1,
          |   | $53[INT64]:= 2,
          |   | $54[STRING]:= "a"
          |   +-SingleRow
          +-Filter $is_null($1) AND $is_null($2)
            +-Scan(arimax_model)
                $1:arima_model_info[STRUCT<non_seasonal_p INT64, non_seasonal_d INT64, non_seasonal_q
INT64, error_code INT64, has_drift BOOL, has_holiday_effect BOOL, has_spikes_and_dips BOOL,
has_step_changes BOOL, aic DOUBLE, log_likelihood DOUBLE, variance DOUBLE, intercept_coefficient
DOUBLE, error_message STRING, ar_coefficients ARRAY<DOUBLE>, ma_coefficients ARRAY<DOUBLE>,
seasonal_periods ARRAY<STRING>>],
                $2:time_series_data[DOUBLE],
                $3:f_n1[DOUBLE],
                $4:f_n2[DOUBLE],
                $5:f_c1[ARRAY<STRUCT<value STRING, weight DOUBLE>>],
                $6:__INTERCEPT__[DOUBLE]
```

FIG. 4B

MULTIVARIATE TIME SERIES ANOMALY DETECTION

CROSS REFERENCE TO RELATED APPLICATIONS

This U.S. patent application claims priority under 35 U.S.C. § 119 (e) to U.S. Provisional Application 63/607,784, filed on Dec. 8, 2023. The disclosure of this prior application is considered part of the disclosure of this application and is hereby incorporated by reference in its entirety.

TECHNICAL FIELD

This disclosure relates to multivariate time series anomaly detection.

BACKGROUND

Anomaly detection in time series data has a wide range of applications such as credit card fraud detection, intrusion detection in cybersecurity, or fault diagnosis in industry. There are two primary types of anomalies in time series. The first type of anomalies are related to noise, erroneous, or unwanted data, which are generally not interesting to data analysts. These types of anomalies should typically be deleted or corrected to improve the data quality and generate a cleaner dataset that can be used by other data mining algorithms. For example, sensor transmission errors are eliminated to obtain more accurate predictions. The second type of anomalies is related to some events of interest. In recent years and, especially in the area of time series data, many researchers have aimed to detect and analyze unusual but interesting phenomena. Fraud detection is a common example as the main objective to detect and analyze the anomaly itself.

SUMMARY

One aspect of the disclosure provides a method for detecting anomalies in multivariate time series. The computer-implemented method, when executed by data processing hardware, causes the data processing hardware to perform operations. The operations include receiving a time series anomaly detection query from a user that requests the data processing hardware to determine one or more anomalies in a set of multivariate time series data values. The set of multivariate time series data values includes an endogenous variable and at least one exogenous variable. The operations also include determining an impact of the at least one exogenous variable on the endogenous variable and determining, using the impact of the at least one exogenous variable on the endogenous variable, a set of univariate time series data values. The operations include training one or more models using each time series data value in the set of univariate time series data values. For each respective time series data value in the set of univariate time series data values, the operations include determining, using the trained one or more models and the impact of the at least one exogenous variable on the endogenous variable, an expected data value for the respective time series data value and determining a difference between the expected data value for the respective time series data value and the respective time series data value. For a particular time series data value in the set of univariate time series data values, the operations include determining that the difference between the expected data value for the particular time series data value and the particular time series data value satisfies a threshold. In response to determining that the difference between the expected data value for the particular time series data value and the particular time series data value satisfies the threshold, the operations include determining that the particular time series data value is anomalous. The operations also include reporting the anomalous particular time series data value to the user.

Implementations of the disclosure may include one or more of the following optional features. In some implementations, determining the impact of the at least one exogenous variable on the endogenous variable includes using linear regression. Optionally, determining the set of univariate time series data values includes determining, using the impact of the at least one exogenous variable on the endogenous variable, a residual based on a difference between the set of multivariate time series data values and the impact of the at least one exogenous variable on the endogenous variable.

In some examples, determining the expected data value for the respective time series data value includes determining a univariate expected data value for the respected time series data value and summing the univariate expected data value with the impact of the at least one exogenous variable on the endogenous variable. The time series anomaly detection query may include a single Structured Query Language (SQL) query.

In some implementations, determining that the difference between the expected data value for the particular time series data value and the particular time series data value satisfies the threshold includes determining an upper threshold based on a sum of the expected data value for the respective time series data value and an interval size and determining a lower threshold based on a difference of the expected data value for the respective time series data value and the interval size. In some of these implementations, the interval size is based on an anomaly probability threshold. The time series anomaly detection query may include the anomaly probability threshold.

In some examples, determining, using the trained one or more models, the expected data value for the respective time series data value includes decomposing, using the trained one or more models, each time series data value in the set of time series data values into a plurality of components. In some of these examples, the plurality of components includes one or more of a trend component, a holiday effect component, a seasonal component, and a step change component.

Another aspect of the disclosure provides a system for detecting anomalies in multivariate time series. The system includes data processing hardware and memory hardware in communication with the data processing hardware. The memory hardware stores instructions that when executed on the data processing hardware cause the data processing hardware to perform operations. The operations include receiving a time series anomaly detection query from a user that requests the data processing hardware to determine one or more anomalies in a set of multivariate time series data values. The set of multivariate time series data values includes an endogenous variable and at least one exogenous variable. The operations also include determining an impact of the at least one exogenous variable on the endogenous variable and determining, using the impact of the at least one exogenous variable on the endogenous variable, a set of univariate time series data values. The operations include training one or more models using each time series data value in the set of univariate time series data values. For each respective time series data value in the set of univariate time series data values, the operations include determining, using the trained one or more models and the impact of the at least one exogenous variable on the endogenous variable, an expected data value for the respective time series data value and determining a difference between the expected data value for the respective time series data value and the respective time series data value. For a particular time series data value in the set of univariate time series data values, the operations include determining that the difference between the expected data value for the particular time series data value and the particular time series data value satisfies a threshold. In response to determining that the difference between the expected data value for the particular time series data value and the particular time series data value satisfies the threshold, the operations include determining that the particular time series data value is anomalous. The operations also include reporting the anomalous particular time series data value to the user.

This aspect may include one or more of the following optional features. In some implementations, determining the impact of the at least one exogenous variable on the endogenous variable includes using linear regression. Optionally, determining the set of univariate time series data values includes determining, using the impact of the at least one exogenous variable on the endogenous variable, a residual based on a difference between the set of multivariate time series data values and the impact of the at least one exogenous variable on the endogenous variable.

In some examples, determining the expected data value for the respective time series data value includes determining a univariate expected data value for the respected time series data value and summing the univariate expected data value with the impact of the at least one exogenous variable on the endogenous variable. The time series anomaly detection query may include a single Structured Query Language (SQL) query.

In some implementations, determining that the difference between the expected data value for the particular time series data value and the particular time series data value satisfies the threshold includes determining an upper threshold based on a sum of the expected data value for the respective time series data value and an interval size and determining a lower threshold based on a difference of the expected data value for the respective time series data value and the interval size. In some of these implementations, the interval size is based on an anomaly probability threshold. The time series anomaly detection query may include the anomaly probability threshold.

In some examples, determining, using the trained one or more models, the expected data value for the respective time series data value includes decomposing, using the trained one or more models, each time series data value in the set of time series data values into a plurality of components. In some of these examples, the plurality of components includes one or more of a trend component, a holiday effect component, a seasonal component, and a step change component.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 4A and 4B are schematic views of exemplary algebrizer trees.

Like reference symbols in the various drawings indicate like elements.

DETAILED DESCRIPTION

Figure 1:
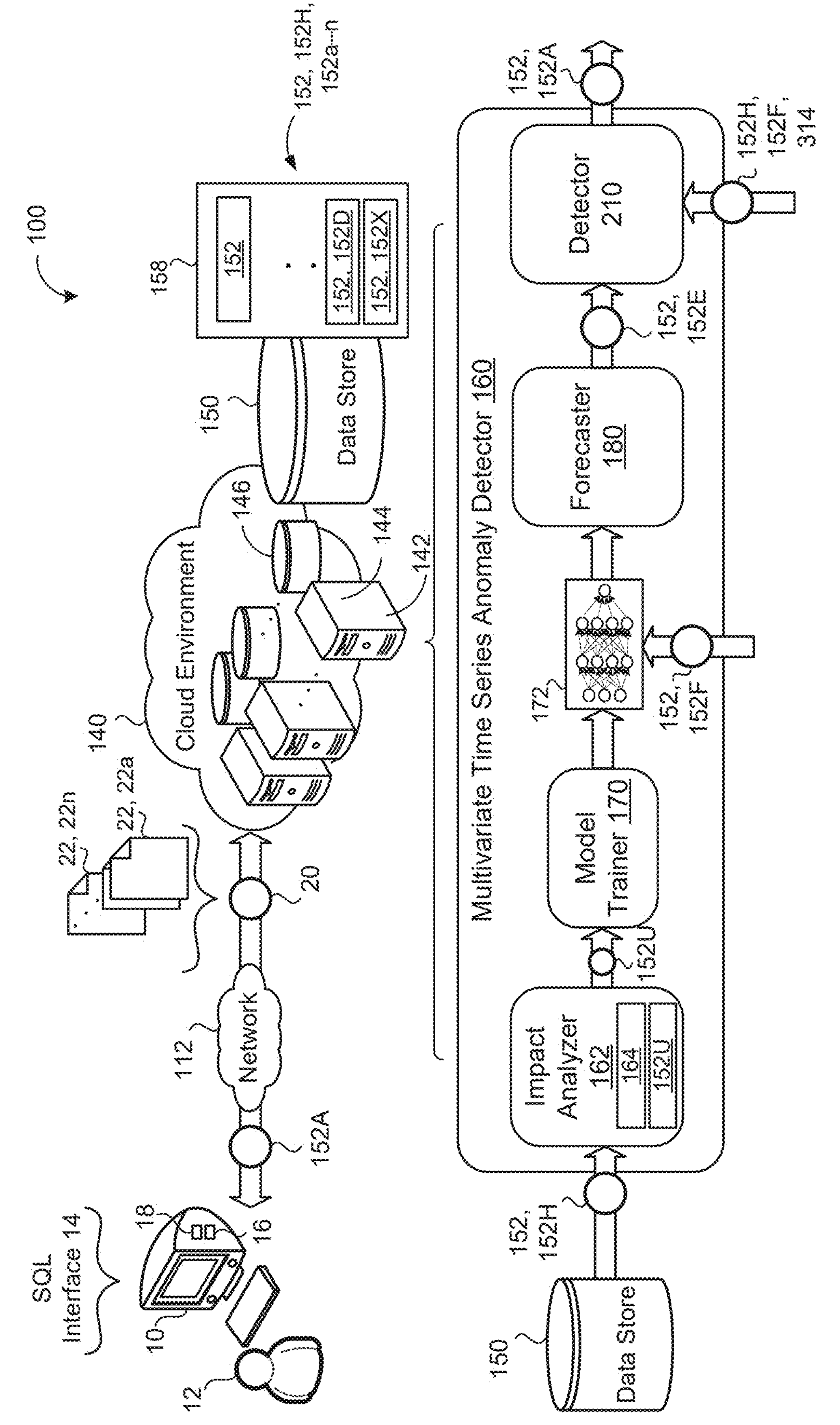
FIG. 1 is a schematic view of an example system for detecting anomalies in time series data.

A time series is a series of data points in chronological sequence (typically in regular intervals). Analysis on a time series may be applied to any variable that changes over time (e.g., industrial processes or business metrics). Time series forecasting is the practice of predicting (i.e., extrapolating) future data values based on past data values. Because so many prediction problems involve a time component, time series forecasting is an active area of interest. Specifically, time series forecasting has become a significant domain for machine learning. However, due to the inherent non-stationarity and uncertainty, time series forecasting remains a challenging problem.

A univariate time series model uses a single historical time series to predict a future value. In contrast, a multivariate time series model uses the historical time series plus extra factors to predict a future value. For example, when forecasting future temperatures, a univariate model may only consider the historical temperature series to predict the next value. A multivariate model may instead consider the impact of other factors such as weather and season. In this example, the historical temperature may be referred to as an endogenous variable, while the additional factors such as weather and season may be referred to as exogenous variables.

Anomaly detection in time series data has a wide range of applications such as credit card fraud detection, intrusion detection in cybersecurity, or fault diagnosis in industry. There are two primary types of anomalies in time series data. For the first type, anomaly detection allows users to discard data points that are the result of, for example, noise, errors, or other unwanted data to improve the quality of the remaining data. For the second type, anomaly detection is important because the anomaly itself is an event of interest.

Implementations herein are directed toward a multivariate time series anomaly detection system that is capable of automatically detecting anomalies at large-scale. The system may detect anomalies in historical data or detect anomalies in future data using one or more trained models using a single endogenous variable and one or more exogenous variables. The system allows users to become immediately aware of unusual data using a comprehensive and convenient anomaly analysis. The system helps users detect anomalies in historical data, which not only processes the time series for further analysis, but also identifies special events that happened during the past. The system also helps users detect anomalies in future data using a trained model to shorten time until discovery of issues. For example, when traffic for a specific product page suddenly and unexpectedly increases, the cause may be from an error in a pricing process that leads to an erroneously low price. The system is also highly scalable, which allows users to use an online query (e.g., a Structured Query Language (SQL) query) to detect anomalies in hundreds of thousands of time series or more.

These implementations provide several technical solutions to overcome common challenges in anomaly detection. One such solution is the use of linear regression to determine the impact of exogenous variables on endogenous variables, which helps in isolating the true anomalies from noise. For instance, some implementations filter out anomalies caused by sensor transmission errors, thereby improving the accuracy of the anomaly detection process. Another advantage is the ability to perform hyper-parameter tuning, which optimizes the parameters of the forecasting models to enhance their predictive accuracy. This is particularly useful in scenarios where the time series data exhibits seasonal effects, holiday effects, or other complex patterns. For example, the implementations adjust for seasonal variations in sales data, ensuring that only genuine anomalies are flagged.

The implementation may also include a feature for decomposing time series data into multiple components such as trend, seasonal, and holiday effects. This decomposition allows for a more granular analysis of the data, making it easier to identify the root causes of anomalies. For example, a sudden spike in sales can be attributed to a holiday effect rather than an error in the data. Furthermore, scalability is enhanced by the ability to handle online queries efficiently. Users may submit a single Structured Query Language (SQL) query to analyze vast amounts of time series data, making the system suitable for large-scale applications such as monitoring network traffic or industrial processes. Overall, these technical solutions and advantages make these implementations a robust tool for anomaly detection in multivariate time series data, providing users with accurate, timely, and actionable insights.

Referring now to FIG. 1, in some implementations, an example multivariate time series anomaly detection system 100 includes a remote system 140 in communication with one or more user devices 10 via a network 112. The remote system 140 may be a single computer, multiple computers, or a distributed system (e.g., a cloud environment) having scalable/elastic resources 142 including computing resources 144 (e.g., data processing hardware) and/or storage resources 146 (e.g., memory hardware). A datastore 150 (i.e., a remote storage device) may be overlain on the storage resources 146 to allow scalable use of the storage resources 146 by one or more of the clients (e.g., the user device 10) or the computing resources 144. The datastore 150 is configured to store a plurality of multivariate time series data values 152, 152*a-n* within one or more tables 158 (i.e., a cloud database). Each time series data value 152 may be an endogenous variable 152, 152D) (i.e., a time series data value that is changed or determined by other variables) or an exogenous variable 152, 152X (i.e., an independent variable).

The remote system 140 is configured to receive a time series anomaly detection query 20 from a user device 10 associated with a respective user 12 via, for example, the network 112. The user device 10 may correspond to any computing device, such as a desktop workstation, a laptop workstation, or a mobile device (i.e., a smart phone). The user device 10 includes computing resources 18 (e.g., data processing hardware) and/or storage resources 16 (e.g., memory hardware). The user 12 may construct the query 20 using a Structured Query Language (SQL) interface 14. Each time series anomaly detection query 20 requests the remote system 140 to determine whether one or more anomalies are present in one or more detection requests 22, 22*a-n*.

The remote system 140 executes a time series anomaly detector 160 for detecting anomalous data values 152, 152A in historical data values 152, 152H (e.g., multivariate time series data values 152 stored at the datastore 150) and future time series data values, 152, 152F. The time series anomaly detector 160 is configured to receive the query 20 from the user 12 via the user device 10. Each query 20 may include multiple detection requests 22, 22*a-n*. Each detection request 22 requests the time series anomaly detector 160 to detect one or more anomalous data values 152A in a different set of multivariate time series data values 152. That is, the query 20 may include a request for the time series anomaly detector 160 to determine one or more anomalous data values 152A in multiple different sets of multivariate time series data values 152 simultaneously.

The query 20 may include multiple detection requests 22 each requesting the remote system 140 to detect anomalous data values 152A in the historical data values 152H located in one or more tables 158 stored on the datastore 150. Alternatively, the query 20 includes the historical data value 152H. In this case, the user 12 (via the user device 10) may provide the historical data value 152H when the historical data value 152H is not otherwise available via the data storage 150. In some examples, the historical data values 152H are stored in databases with multiple columns and multiple rows. For example, one column includes the time series data while another column includes timestamp data that correlates specific points in time with the time series data.

The multivariate time series anomaly detector 160 includes an impact analyzer 162. The impact analyzer 162 receives historical data 152H retrieved from the datastore 150 and/or provided by the user 12. The impact analyzer 162 determines an impact 164 of at least one exogenous variable 152X on the endogenous variable 152D for one or more of the detection requests 22. For example, a detection request 22 indicates a particular endogenous variable 152D for the multivariate times series forecast and one or more exogenous variables 152X that impact the endogenous variable 152D. The impact 164 represents an amount of effect each exogenous variable 152X has on the endogenous variable 152D.

In some implementations, the impact analyzer 162 determines the impact 164 using linear regression. For example, the linear regression uses the following equation:

$$y_t = c + \beta_0 t + \beta_1 x_{1,t} + \ldots + \beta_n x_{n,t} + \eta_t = l_t + r_t \quad (1)$$

In Equation (1), $y_t$ represents the original time series data, $x_{n,t}$ represents the value of the nth linear regression variable at time t, $\beta_n$ represents the coefficient of the nth linear regression variable, c represents a linear regression constant term, and $\eta_t$ represents an error term at time t. Additionally, $l_t$ is the linear component from the linear regression without the error term, using the original historical data at time t and $r_t$ is a residual between the original time series data and the linear regression fitted data.

The impact analyzer 162, using the impact 164 of the at least one exogenous variable 152X on the endogenous variable 152D, determines a set of univariate time series data values 152, 152U. The set of univariate time series data values 152U represents the multivariate time series data values 152 of the endogenous variable 152D with the impact 164 of the exogenous variable(s) 152X removed. The univariate time series data values 152U may be based on the residual $r_t$ from Equation (1). That is, the univariate time series data values 152U, in some examples, are based on a difference between the set of multivariate time series values 152 and the impact 164 of the at least one exogenous variable 152X on the endogenous variable 152D.

The multivariate time series anomaly detector 160 includes a model trainer 170. The model trainer 170 generates and/or trains one or more forecasting models 172 for each detection request 22 consecutively or simultaneously. Training a model involves feeding it historical data so that it can learn patterns and relationships within the data. This process may include selecting appropriate algorithms, tuning hyperparameters, and validating the model's performance. The model trainer 170 may train the forecasting model(s) 172 on the univariate time series data values 152U determined by the impact analyzer 162.

The model trainer 170 may generate and/or train multiple forecasting models 172 with different parameters. For example, the model trainer 170 generates and train a plurality of autoregressive integrated moving average (ARIMA) models with different orders of the autoregressive models (i.e., the number of time lags and commonly represented as the parameter p), different degrees of differencing (i.e., the number of times the data has had past values subtracted and commonly represented as the parameter d), and an order of the moving-average model (i.e., a size of the moving average window and commonly represented as the parameter q). Using a combination of different parameters (e.g., parameters p, d, and q), the model trainer 170 generates a corresponding forecasting model 172 for each combination. Each model 172 is trained using the same historical data value 152H. One or more parameters may be configurable or partially-configurable by the user 12.

The model trainer 170 may perform hyper-parameter tuning (also known as hyper-parameter optimization) when generating and training the forecasting model(s) 172. A hyper-parameter is a parameter that controls or adjusts the actual learning process while other parameters (e.g., node weights) are learned. For example, the model trainer 170 performs hyper-parameter tuning on a data frequency and non-seasonal order parameters. The model trainer 170 may generate and train forecasting models 172 capable of modeling many different aspects of time series. For example, the forecast models 172 accounts for seasonal effects, holiday effects, modeling drift, and anomalies.

The time series anomaly detector 160 includes a forecaster 180. The forecaster 180, using the trained one or more models 172 and the impact 164, forecasts or determines an expected data value 152, 152E. The forecaster 180 may forecast expected data values 152E for each of the historical data values 152H. That is, after the model 172 is trained (i.e., using historical data values 152H), the multivariate time series anomaly detector 160 may provide each univariate data value 152U derived from each historical data value 152H (i.e., by the impact analyzer 162) to the trained model 172, and based on the model's prediction and the impact 164 associated with the historical data values 152H, the forecaster 180 determines an expected data value 152E for the respective historical data value 152H. In some implementations, the forecaster 180 determines a univariate expected data value 152E (i.e., using the predictions from the model 172) and then sums the univariate expected data value 152E with the impact 164 to determine the final expected data value 152E.

The forecaster 180 may also forecast expected data values 152E for future data values 152F. The historical data values 152H represent time series data values 152 that the model 172 trains on while future data values 152F represent time series data values 152 that the model 172 does not train on. For example, the time series anomaly detector 160 receives the future data values 152F after training the model 172 is complete. The impact analyzer 162 may determine the impact 164 of exogenous variables 152X for the future data values 152F in the same manner as described above with respect to the historical data values 152H.

The time series anomaly detector 160 includes a detector 210. The detector 210 receives the expected data values 152E output from the forecaster 180 and the corresponding historical data value 152H or future data value 152F that was provided as input to the impact analyzer 162. The detector 210 may determine a difference between the expected data value 152E and the corresponding historical data value 152H or future data value 152F. When the difference between the expected data value 152E and the corresponding historical data value 152H (i.e., time series data values 152 the multivariate time series anomaly detector 160 receives before or during training the models 172) or future data value 152F (i.e., time series data values 152 the time series anomaly detector 160 receives after training the model and forecasting the expected data value 152E) satisfies a threshold (e.g., based on an anomaly probability threshold 214 (FIG. 2) received from the user 12), the detector 210 may determine that the corresponding historical data value 152H or future data value 152F is anomalous. In this situation, the detector 210 may report the anomalous respective time series data value 152A to the user 12.

Figure 2:
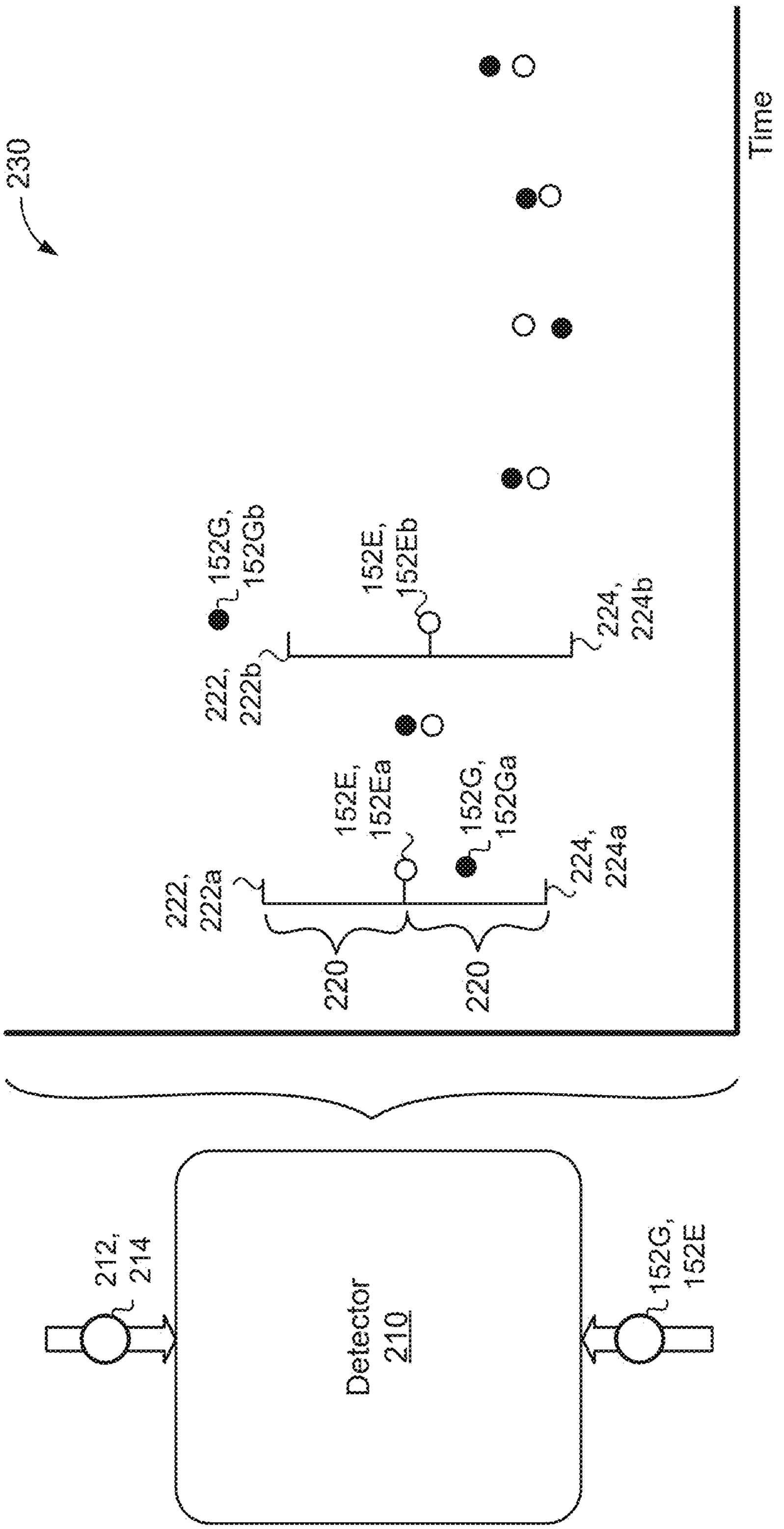
FIG. 2 is a schematic view of an exemplary detector of the system of FIG. 1.

Referring now to FIG. 2, in some examples, the detector 210 determines a difference between each expected data value 152E and a ground truth data value 152G (e.g., a historical data value 152H that has been verified via a measurement) used to forecast or predict the expected data value 152E. Based on this difference, the detector 210 determines whether the ground truth data value 152G is anomalous. In some implementations, the detector 210 determines an interval size 220 that defines an upper bound 222 (or upper threshold) and a lower bound 224 (or lower threshold). Based on the upper bound 222 and the lower bound 224, the detector 210 determines whether a ground truth data value 152G satisfies a threshold and is anomalous. In some examples, the upper bound 222 is equal to the expected data value 152E (i.e., the univariate expected data value predicted by the model 172 and the impact 164) plus the interval size 220 and the lower bound 224 is equal to the expected data value 152E minus the interval size 220. For example, when the ground truth data value 152G exceeds the expected data value 152E by more than a value established by the upper bound 222 or by less than a value established by the lower bound 224, the detector 210 determines the ground truth data value 152G is anomalous. Conversely, when the ground truth data value 152G is less than the upper bound 222 and greater than the lower bound 224 (i.e., close enough to the expected data value 152E), the detector 210 determines that the ground truth data value 152G is not anomalous.

In some implementations, the detector 210 at least partially determines the interval size 220, the upper bound 222, and the lower bound 224 based on a standard error 212 from the trained model(s) and/or an anomaly probability threshold 214. The standard error 212 represents an amount of error measured during training of the models 172. For example, a model 172 with a large error (i.e., the expected data values 152E predicted during training had significant error) is less trustworthy, and thus results in a larger interval size 220. On the other hand, a highly accurate model 172 (i.e., with a low standard error 212) may result in a relatively smaller interval size 220. The anomaly probability threshold 214 may be a user-configurable value (e.g., received via the query 20) that affects the interval size 220. The anomaly probability threshold 214 provides the user 12 with the ability to customize or configure the interval size 220 and thus a likelihood that a ground truth data value is 152G is anomalous. That is, the anomaly probability threshold 214 allows the user 12 to configure a rate of false positives. When the user 12 is sensitive to false positives, the user 12 may opt for a small anomaly probability threshold 214. Conversely if detection is more important than false positives, the user 12 may opt for a larger anomaly probability threshold 214. In some examples, the anomaly probability threshold 214 establishes a confidence threshold the detector 210 must achieve before reporting a time series data value 152 as anomalous. For example, the user 12 provides a 95% anomaly probability threshold 214, which results in the detector 210 only reporting time series data values 152 as anomalous that the detector 210 determines have a 95% or greater probability of being anomalous. In these implementations, the detector 210 decreases the interval size 220 the larger the anomaly probability threshold 214.

In the illustrated example, a plot 230 includes a first expected data value 152E, 152Ea and a first ground truth data value 152G, 152Ga. In this example, a first upper bound 222, 222*a* spans values of the y-axis of the plot 230 from the first expected data value 152Ea plus one interval size 220. Likewise, a first lower bound 224, 224*a* spans the values of the y-axis of the plot 230 from the first expected data value 152Ea minus one interval size 220. Here, the first ground truth data value 152Ga is greater than the first lower bound 224*a* and less than the second upper bound 222*a*, and thus the detector 210 determines that the first ground truth data value 152Ga is not anomalous. A second expected data value 152E, 152Eb of the plot 230 establishes a second upper bound 222, 222*b* and a second lower bound 224, 224*b*. This time, a second ground truth data value 152G, 152Gb is greater than the second upper bound 222*b*, and thus the detector 210 determines that the second ground truth data value 152G is anomalous. While not shown, the detector 210 may determine the upper bound 222 and the lower bound 224 (based on the interval size 220) for each expected data value 152E the models 172 predict. Using the upper bound 222 and the lower bound 224 for each expected data value 152E, the detector 210 determines whether a corresponding ground truth data value 152G (i.e., the actual time series data value 152 being compared to the expected data value 152E) is anomalous. The detector 210 may report only anomalous data values 152A to the user 12. Additionally or alternatively, the detector 210 reports data regarding the comparison (e.g., the relative difference between the expected data value 152E and the ground truth data value 152G) for each time series data value 152.

In some implementations, the multivariate time series anomaly detector 160 includes a plurality of models 172. In these implementations, the model trainer 170 trains each of the plurality of models 172 using the historical data values 152H. In some examples, one or more of the trained models 172 decompose the input time series data value 152 (i.e., the historical data values 152H and/or the future data values 152F) into a plurality of components. The forecaster 180 may receive the plurality of components and aggregate two or more of the components to forecast the expected data value 152E.

In some examples, each of the plurality of models 172 decomposes a different component from the input time series data value 152. For example, one model 172 is trained to perform a holiday adjustment and generate or predict a holiday component of the time series data value 152. As another example, a different model 172 is trained to perform a seasonal and trend decomposition (e.g., using local regression) and generate or predict a seasonal component of the time series data value 152. The seasonal component may account for variations in the time series data values 152 that repeat over a specific period (e.g., a day, week, month, etc.). For example, an increase in sales in December represents a seasonal effect of the seasonal component. The time series anomaly detector 160 may decompose (e.g., via one or more models 172) the univariate time series data values 152 (determined by the impact analyzer 162) into a number of other components, such as a trend component, an outlier component, a spike and dip component, and a step change component. The trend component may represent trends in the data that move up or down in a reasonably predictable pattern.

In some examples, one or more models 172 are used to train other models 172 of the time series anomaly detector 160. For example, the model trainer 170 first trains a holiday adjustment model 172 using the historical data values 152H. After the holiday adjustment model 172 is trained, the model trainer 170 may train an outlier model 172 using time series data values 152 with the holiday component removed by the holiday adjustment model 172. Similarly, the model trainer 170 may train a seasonal and trend decomposition model 172 using time series data values 152 with the holiday component removed by the holiday adjustment model 172 and outliers removed by the outlier model 172. In this way, the model trainer 170 may train a "chain" of models 172 that each are responsible for generating one of the decomposition components of the time series data values 152.

In some implementations, the forecaster 180 forecasts the expected data values 152E based on a sum of multiple components predicted or determined by the model(s) 172. For example, the forecaster 180 forecasts the expected data value 152E based on a sum of a trend component, a holiday effect component, a seasonal period component, and a step change component. In scenarios where the step change component cannot be predicted (e.g., for future data values 152F), the forecaster 180 may forecast the expected data value 152E based on a sum of the trend component, the holiday effect component, and the seasonal period component, and the impact 164. The forecaster 180 provides the expected data value 152E to the detector 210.

Figure 3A:
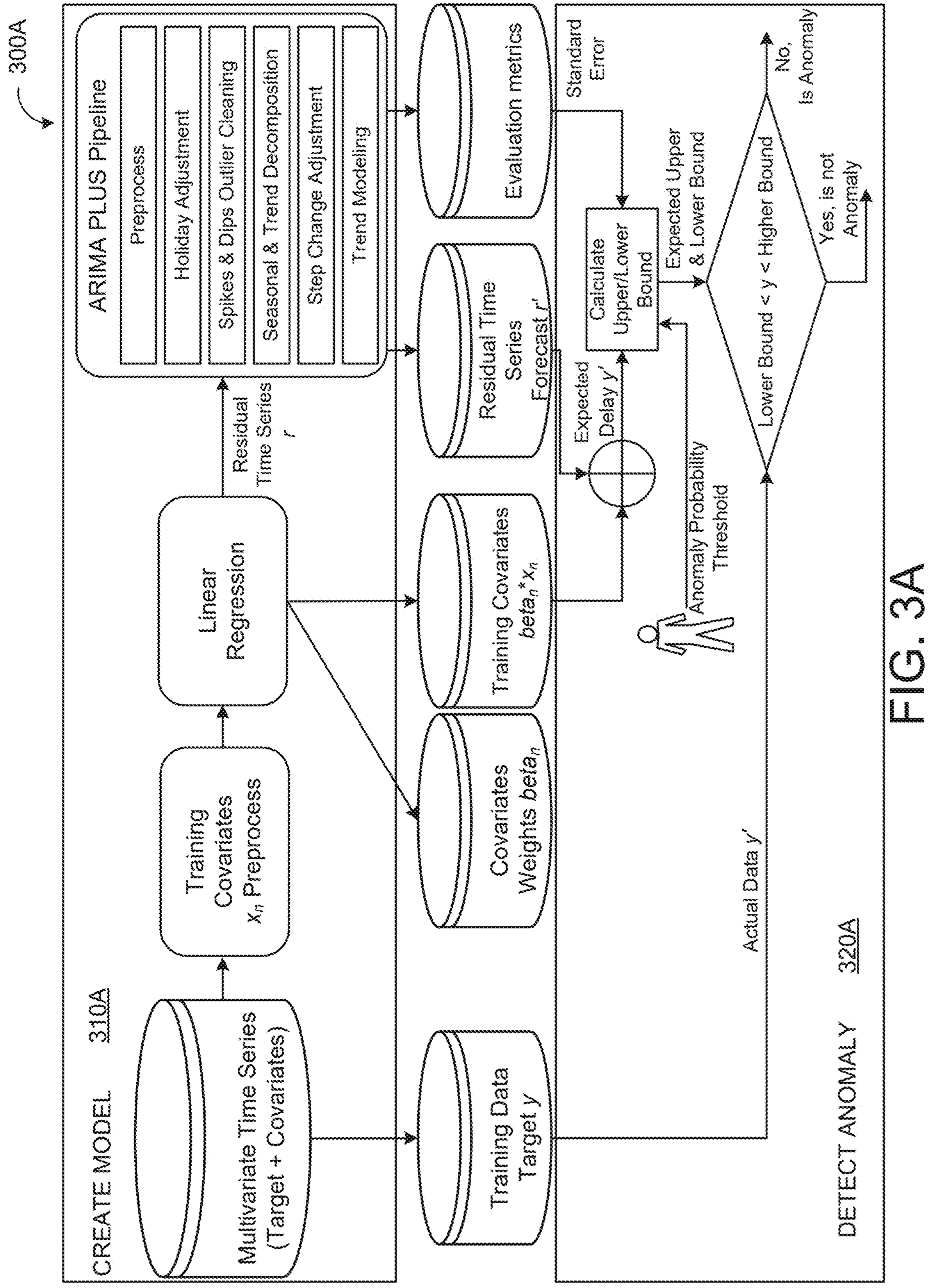
FIGS. 3A and 3B are schematic views of a two-step process for the system of FIG. 1.
Figure 3B:
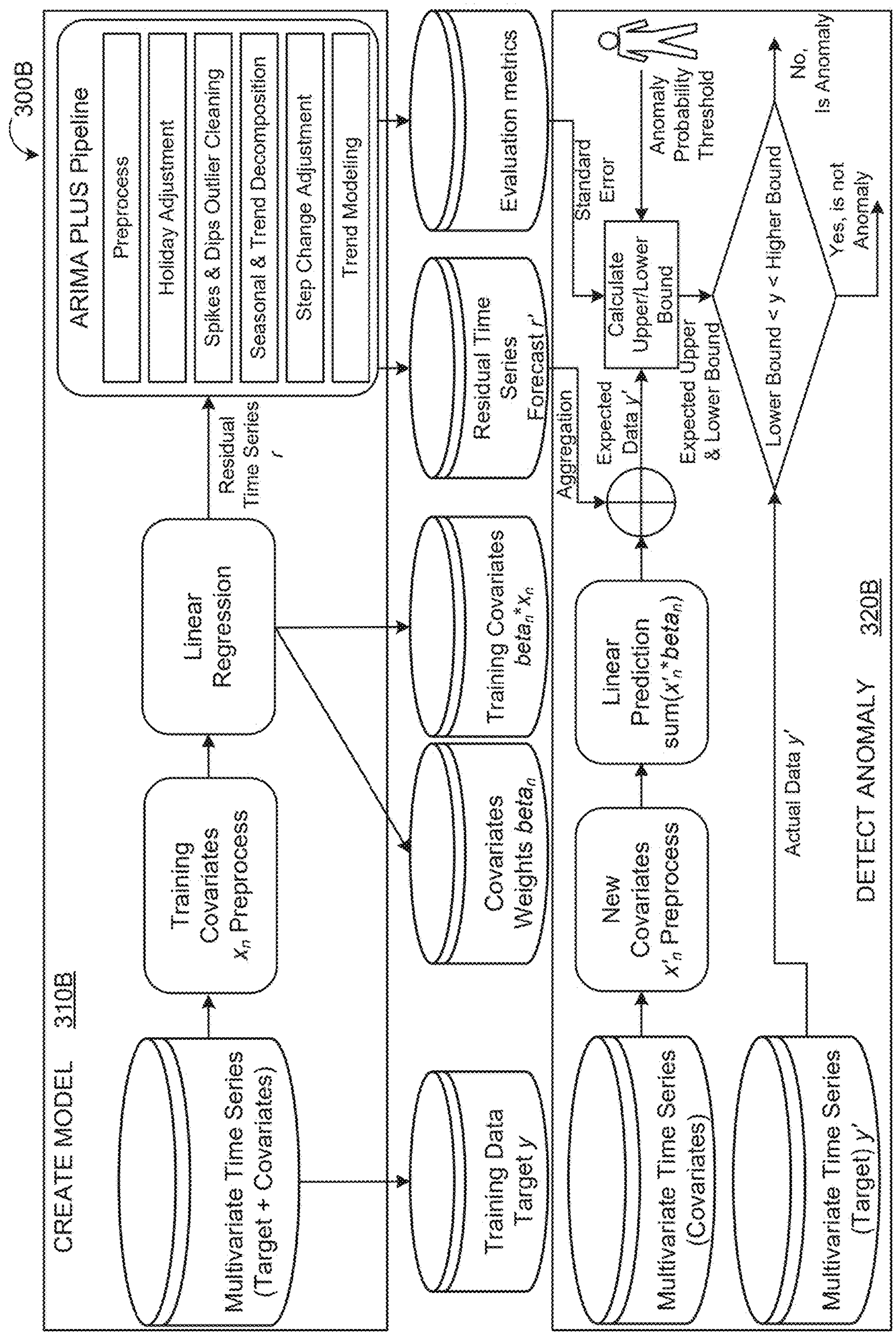

FIG. 3A includes a schematic view 300A of an exemplary two-step process for forecasting a multivariate time series using historical data (i.e., forecasting using data that the model 172 is trained on). In a first step 310A, the model 172 is created by training the model 172 using univariate time series data derived from the multivariate time series data. The univariate time series data may be derived using linear regression. After the one or more models 172 are trained, a second step 320A includes using the trained model 172 to forecast the expected data values 152E. This may include using the trained model 172 to forecast a univariate expected data value 152 and then aggregating or summing the impact 164 to the univariate expected data value 152. Using the expected data value 152E, the system may determine whether any data values 152 are anomalous. Because the data was previously trained on, the system may retrieve the impact 164 and univariate time series values 152U (e.g., from the datastore 150) without having to recreate them. FIG. 3B includes a schematic view 300B of another exemplary two-step process for forecasting a multivariate time series using new data (i.e., additional data after the model 172 has been previously trained on different data). Here, the model 172 is trained at step 310B in a similar way to step 310A of FIG. 3A, however, at step 320B, the system must determine the impact 164 and univariate time series values 152U for the multivariate time series values 152 (i.e., because the data is new).

FIGS. 4A and 4B include exemplary algebrizer trees 400A, 400B. The algebrizer trees 400A, 400B may be responsible for receiving and processing the anomaly detection query 20 from the user 12. Algebrizer trees are data structures used in query processing to break down and organize the components of a query into a hierarchical format. This hierarchical structure allows for efficient parsing and execution of the query by systematically evaluating each component. For example, the exemplary algebrizer tree 400A is at least partially responsible for retrieving the historical data 152H, determining the impact 164 for the historical data 152H, determining the interval size 220, the upper bound 222, and the lower bound 224. The algebrizer tree 400A may also determine, based the bounds 222, 224, whether any of the historical data values 152H are anomalous. The exemplary algebrizer tree 400B is similar in function to the algebrizer tree 400A, except instead this tree 400B is responsible for new data (i.e., additional data after the model 172 has been previously trained on different data), which requires determining the linear component from the linear regression (i.e., without the error term).

Figure 5:
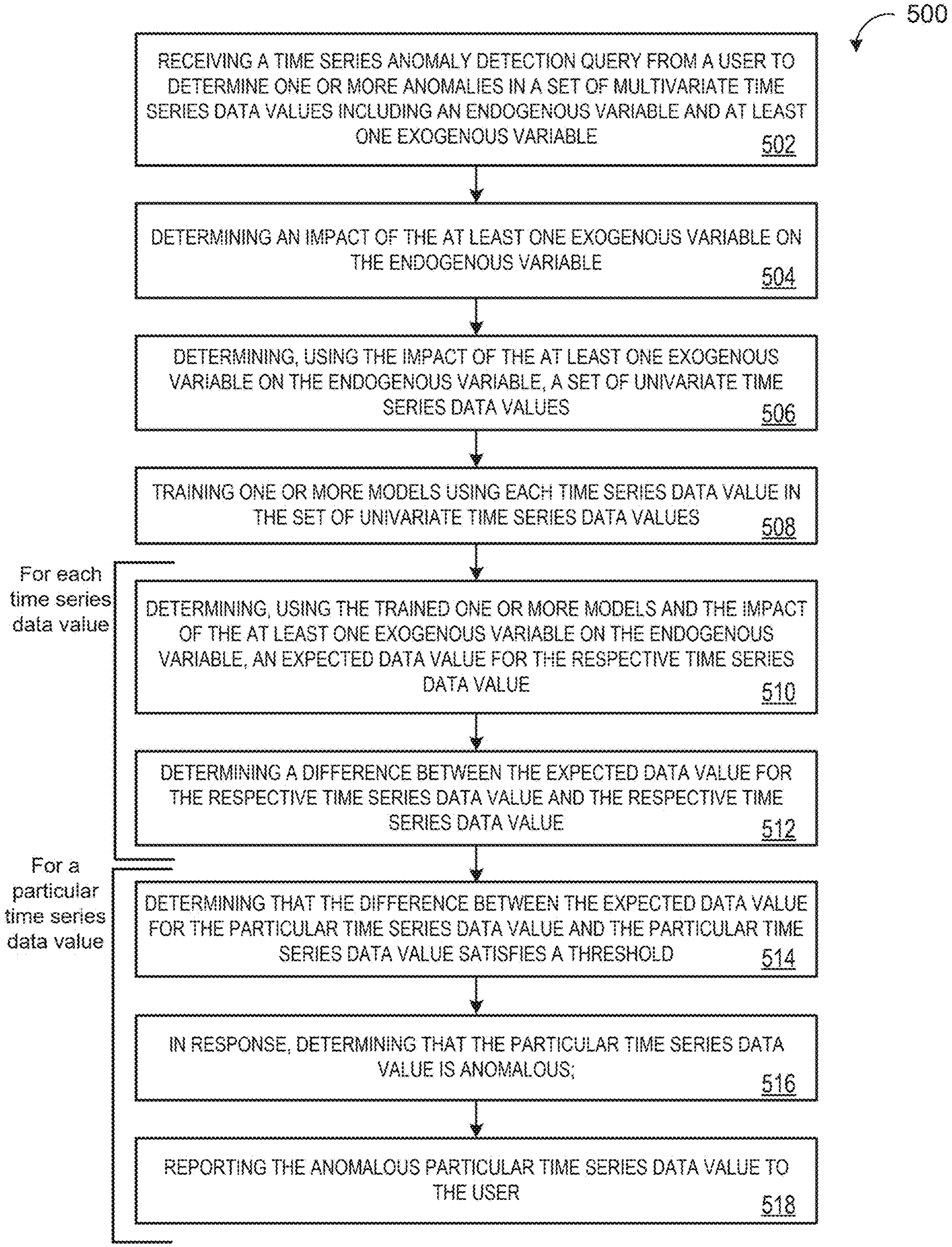
FIG. 5 is a flowchart of an example arrangement of operations for a method of detecting anomalies in time series data.

FIG. 5 is a flowchart of an exemplary arrangement of operations for a method 500 for multivariate time series anomaly detection. The computer-implemented method 500, executed by data processing hardware 144, causes the data processing hardware 144 to perform operations. The method 500, at operation 502, includes receiving a time series anomaly detection query 20 from a user 12. The time series anomaly detection query 20 requests the data processing hardware 144 to determine one or more anomalies 152A in a set of multivariate time series data values 152. The set of multivariate time series data values 152 include an endogenous variable 152D and at least one exogenous variable 152X. The method 500, at operation 504, includes determining an impact 164 of the at least one exogenous variable 152X on the endogenous variable 152D. This leverages the technical advantage of using linear regression to isolate the true anomalies from noise, which is crucial for accurate anomaly detection. By determining the impact of exogenous variables, the method can filter out anomalies caused by sensor transmission errors, thereby improving the accuracy of the anomaly detection process. This approach ensures that only genuine anomalies are flagged, enhancing the reliability of the method.

At operation 506, the method 500 includes determining, using the impact 164 of the at least one exogenous variable 152X on the endogenous variable 152D, a set of univariate time series data values 152U. This provides the benefit of simplifying the multivariate time series data into univariate data, which is easier to analyze and model. The univariate time series data values represent the multivariate time series data values of the endogenous variable with the impact of the exogenous variables removed. This simplification allows for more accurate training of the models, as it reduces the complexity of the data being analyzed. At operation 508, the method 500 includes training one or more models 172 using each time series data value 152 in the set of univariate time series data values 152U. Training the models on univariate data values derived from multivariate data ensures that the models can accurately learn patterns and relationships within the data. This step may include hyper-parameter tuning, which optimizes the parameters of the forecasting models to enhance their predictive accuracy. This is particularly useful in scenarios where the time series data exhibits seasonal effects, holiday effects, or other complex patterns. The trained models can then be used to forecast expected data values with high accuracy.

For each respective time series data value 152 in the set of univariate time series data values 152U, the method 500 includes, at operation 510, determining, using the trained one or more models 172 and the impact 164 of the at least one exogenous variable 152X on the endogenous variable 152D, an expected data value 152E for the respective time series data value 152. This step may include decomposing the time series data into multiple components such as trend, seasonal, and holiday effects. This decomposition allows for a more granular analysis of the data, making it easier to identify the root causes of anomalies. For example, a sudden spike in sales can be attributed to a holiday effect rather than an error in the data. The method 500, at operation 512, includes determining a difference between the expected data value 152E for the respective time series data value 152 and the respective time series data value 152. This difference may be used to identify anomalies, ensuring that only significant deviations from the expected values are flagged.

For a particular time series data value 152 in the set of univariate time series data values 152U, the method 500 includes, at operation 514, determining that the difference between the expected data value 152E for the particular time series data value 152 and the particular time series data value 152 satisfies a threshold. The method 500 includes, at operation 516, in response to determining that the difference between the expected data value 152E for the particular time series data value 152 and the particular time series data value 152 satisfies the threshold, determining that the particular time series data value 152A is anomalous. The method 500 includes, at operation 518, reporting the anomalous particular time series data value 152A to the user 12.

Figure 6:
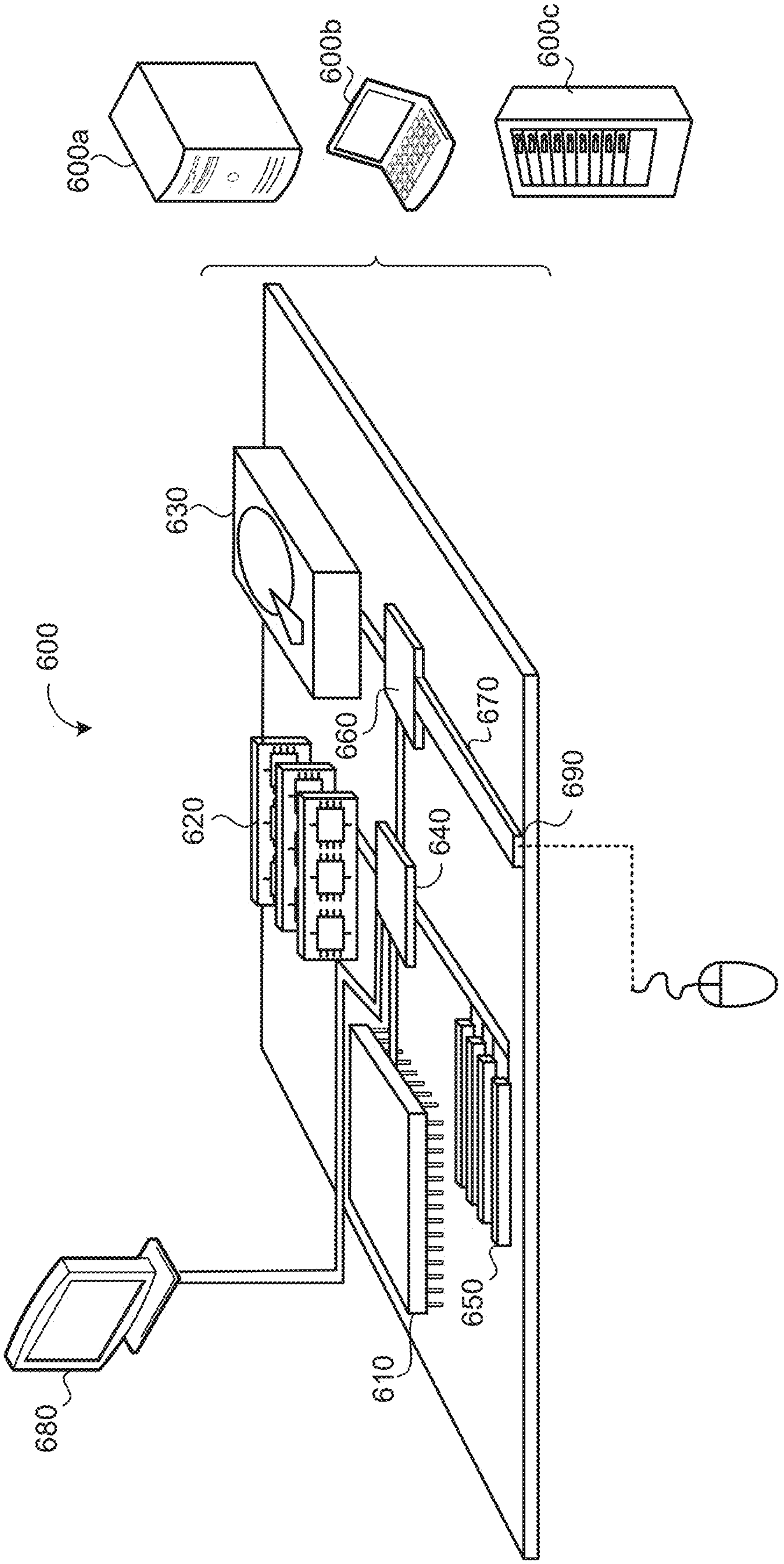
FIG. 6 is a schematic view of an example computing device that may be used to implement the systems and methods described herein.

FIG. 6 is a schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server **600*a* or multiple times in a group of such servers 600*a*, as a laptop computer 600*b*, or as part of a rack server system 600*c***.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware that causes the data processing hardware to perform operations comprising:
- receiving a time series anomaly detection query from a user, the time series anomaly detection query requesting the data processing hardware to determine one or more anomalies in a set of multivariate time series data values, the set of multivariate time series data values comprising an endogenous variable and at least one exogenous variable;
- determining an impact of the at least one exogenous variable on the endogenous variable;
- determining, using the impact of the at least one exogenous variable on the endogenous variable, a set of univariate time series data values;
- training one or more models using each time series data value in the set of univariate time series data values;
- for each respective time series data value in the set of univariate time series data values:
  - determining, using the trained one or more models and the impact of the at least one exogenous variable on the endogenous variable, an expected data value for the respective time series data value; and
  - determining a difference between the expected data value for the respective time series data value and the respective time series data value; and
- for a particular time series data value in the set of univariate time series data values:
  - determining that the difference between the expected data value for the particular time series data value and the particular time series data value satisfies a threshold;
  - in response to determining that the difference between the expected data value for the particular time series data value and the particular time series data value satisfies the threshold, determining that the particular time series data value is anomalous; and
  - reporting the anomalous particular time series data value to the user.

2. The method of claim 1, wherein determining the impact of the at least one exogenous variable on the endogenous variable comprises using linear regression.

3. The method of claim 1, wherein determining the set of univariate time series data values comprises determining, using the impact of the at least one exogenous variable on the endogenous variable, a residual based on a difference between the set of multivariate time series data values and the impact of the at least one exogenous variable on the endogenous variable.

4. The method of claim 1, wherein determining the expected data value for the respective time series data value comprises:
- determining a univariate expected data value for the respected time series data value; and
- summing the univariate expected data value with the impact of the at least one exogenous variable on the endogenous variable.

5. The method of claim 1, wherein the time series anomaly detection query comprises a single Structured Query Language (SQL) query.

6. The method of claim 1, wherein determining that the difference between the expected data value for the particular time series data value and the particular time series data value satisfies the threshold comprises:
- determining an upper threshold based on a sum of the expected data value for the respective time series data value and an interval size; and
- determining a lower threshold based on a difference of the expected data value for the respective time series data value and the interval size.

7. The method of claim 6, wherein the interval size is based on an anomaly probability threshold.

8. The method of claim 7, wherein the time series anomaly detection query comprises the anomaly probability threshold.

9. The method of claim 1, wherein determining, using the trained one or more models, the expected data value for the respective time series data value comprises decomposing, using the trained one or more models, each time series data value in the set of time series data values into a plurality of components.

10. The method of claim 9, wherein the plurality of components comprises one or more of a trend component, a holiday effect component, a seasonal component, and a step change component.

11. A system comprising:
- data processing hardware; and
- memory hardware in communication with the data processing hardware, the memory hardware storing instructions that when executed on the data processing hardware cause the data processing hardware to perform operations comprising:
  - receiving a time series anomaly detection query from a user, the time series anomaly detection query requesting the data processing hardware to determine one or more anomalies in a set of multivariate time series data values, the set of multivariate time series data values comprising an endogenous variable and at least one exogenous variable;
  - determining an impact of the at least one exogenous variable on the endogenous variable;
  - determining, using the impact of the at least one exogenous variable on the endogenous variable, a set of univariate time series data values;
  - training one or more models using each time series data value in the set of univariate time series data values;
  - for each respective time series data value in the set of univariate time series data values:
    - determining, using the trained one or more models and the impact of the at least one exogenous variable on the endogenous variable, an expected data value for the respective time series data value; and determining a difference between the expected data value for the respective time series data value and the respective time series data value; and for a particular time series data value in the set of univariate time series data values:

determining that the difference between the expected data value for the particular time series data value and the particular time series data value satisfies a threshold;

in response to determining that the difference between the expected data value for the particular time series data value and the particular time series data value satisfies the threshold, determining that the particular time series data value is anomalous; and reporting the anomalous particular time series data value to the user.

12. The system of claim 11, wherein determining the impact of the at least one exogenous variable on the endogenous variable comprises using linear regression.

13. The system of claim 11, wherein determining the set of univariate time series data values comprises determining, using the impact of the at least one exogenous variable on the endogenous variable, a residual based on a difference between the set of multivariate time series data values and the impact of the at least one exogenous variable on the endogenous variable.

14. The system of claim 11, wherein determining the expected data value for the respective time series data value comprises:

determining a univariate expected data value for the respected time series data value; and summing the univariate expected data value with the impact of the at least one exogenous variable on the endogenous variable.

15. The system of claim 11, wherein the time series anomaly detection query comprises a single Structured Query Language (SQL) query.

16. The system of claim 11, wherein determining that the difference between the expected data value for the particular time series data value and the particular time series data value satisfies the threshold comprises:

determining an upper threshold based on a sum of the expected data value for the respective time series data value and an interval size; and determining a lower threshold based on a difference of the expected data value for the respective time series data value and the interval size.

17. The system of claim 16, wherein the interval size is based on an anomaly probability threshold.

18. The system of claim 17, wherein the time series anomaly detection query comprises the anomaly probability threshold.

19. The system of claim 11, wherein determining, using the trained one or more models, the expected data value for the respective time series data value comprises decomposing, using the trained one or more models, each time series data value in the set of time series data values into a plurality of components.

20. The system of claim 19, wherein the plurality of components comprises one or more of a trend component, a holiday effect component, a seasonal component, and a step change component.

* * * * *